United States Patent
Lam et al.

(10) Patent No.: US 12,229,884 B1
(45) Date of Patent: Feb. 18, 2025

(54) STREAMLINED CONSTRUCTION OF 3D BUILDING AND NAVIGATION NETWORK

(71) Applicant: Hong Kong Applied Science and Technology Research Institute Company Limited, Hong Kong (HK)

(72) Inventors: Tak Wing Lam, Hong Kong (HK); Tak Fuk Wong, Hong Kong (HK); Ka Wah Wong, Hong Kong (HK); Kwok Fai Ng, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 18/443,239

(22) Filed: Feb. 15, 2024

(51) Int. Cl.
  *G06T 17/00* (2006.01)
  *H04L 9/32* (2006.01)
(52) U.S. Cl.
  CPC ............ *G06T 17/00* (2013.01); *H04L 9/3236* (2013.01)
(58) Field of Classification Search
  None
  See application file for complete search history.

(56) References Cited

U.S. PATENT DOCUMENTS

| 9,996,636 B2 | 6/2018 | Jovanovic |
| 11,022,442 B1 | 6/2021 | Paskaris et al. |
| 11,494,973 B2 | 11/2022 | Boyadzhiev et al. |
| 2009/0092289 A1 | 4/2009 | Rye |
| 2015/0029182 A1 | 1/2015 | Sun et al. |
| 2019/0072395 A1 | 3/2019 | Namboodiri et al. |

FOREIGN PATENT DOCUMENTS

| CN | 109960717 A | 7/2019 |
| CN | 109974703 A | 7/2019 |
| CN | 112229408 A | 1/2021 |

OTHER PUBLICATIONS

ISR and Written Opinion, PCT/CN2024/077937, Oct. 18, 2024.
Dariusz Gotlib, Michał Wyszomirski and Miłosz Gnat, "A Simplified Method of Cartographic Visualisation of Buildings' Interiors (2D+) for Navigation Applications", ISPRS Int. J. Geo-Inf. 2020, 9(6), 407, Jun. 26, 2020.

*Primary Examiner* — Peter Hoang
(74) *Attorney, Agent, or Firm* — gPatent LLC; Stuart T. Auvinen

(57) ABSTRACT

A 3D building model generator has a server that constructs a 3D texture model for each floor in a building by extruding a 2D floor plan to 3D using user-inputted heights, and adding photos captured by a smartphone or mobile device as textures to image planes for surfaces in the 3D model. The server displays on the smartphone a floor-plan portion, or a virtual 3D display based on the camera orientation with a facing wall highlighted and confirmed by a smartphone user. The user moves mapping points overlaid upon the photo to wall corners to map the photo to the facing surface in the model. The user flags rooms and exits such as doors and elevators as walkable. The server stacks the 3D texture model for the floors and connects them into a walkable network of the rooms and exits that are flagged as walkable. Hashing removes duplicate floorplans.

20 Claims, 20 Drawing Sheets

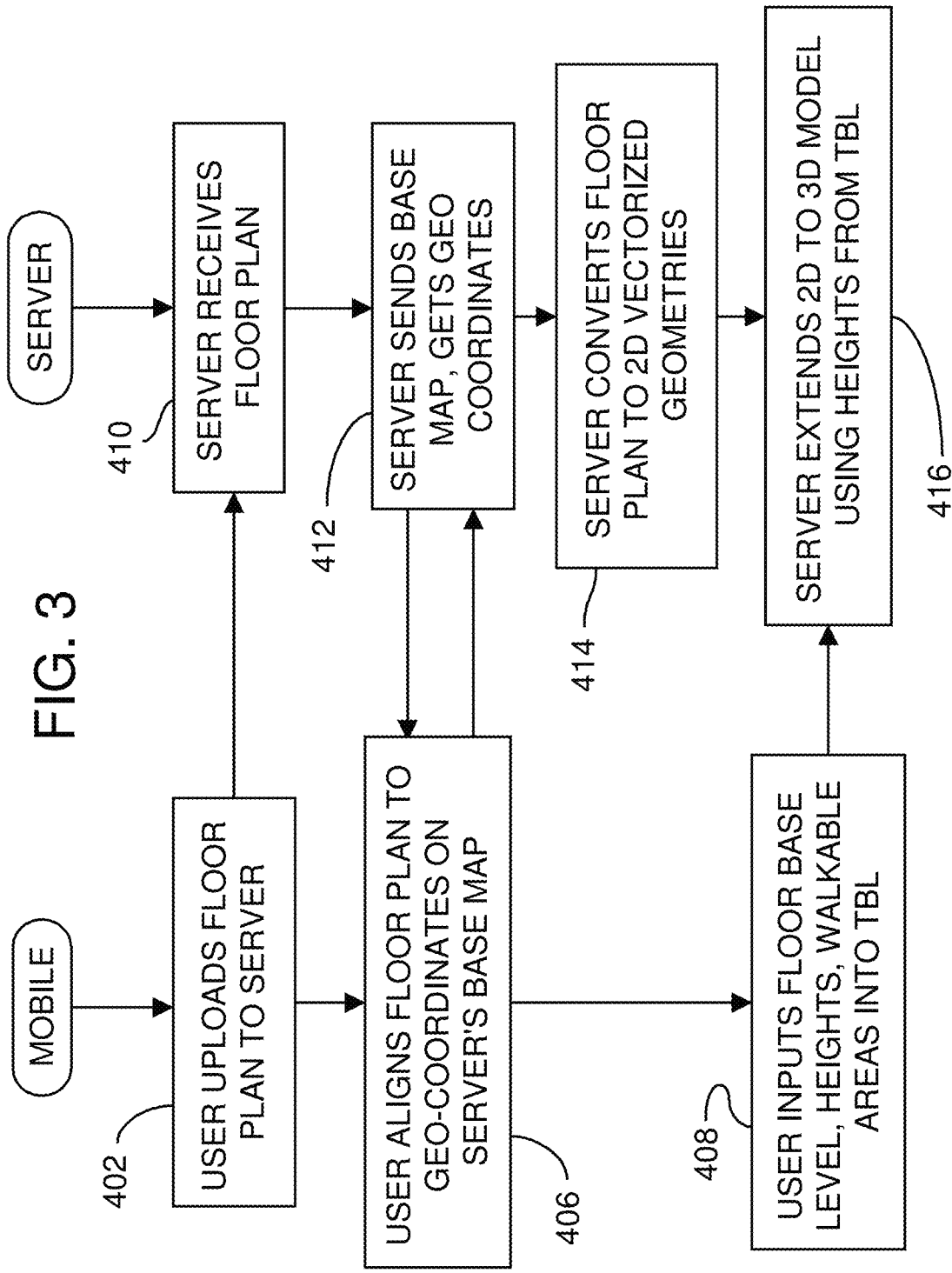

| GEOMETRY | ID | DESCRIPTION | PARENT_ID | FLOOR BASE LEVEL (M) | FLOOR HEIGHT (M) | FALSE CEILING HEIGHT (M) |
|---|---|---|---|---|---|---|
| POLYGON | ID_G/F | FLOOR GEOMETRY | NULL | 0 | 4 | 3 |
| POLYGON | ID_1/F | FLOOR GEOMETRY | NULL | 4 | 4 | 3 |
| POLYGON | ID_G/F_LOBBY | INDIVIDUAL UNITS | ID_G/F | 0 | 4 | 3 |
| LINE | ID_G/F_LOBBY_EXIT | EXIT | ID_G/F | 0 | - | 3 |
| LINE | ID_1F_STAIR_EXIT | EXIT | ID_G/F | 0 | - | - |

FIG. 6

| PHOTO ID | LOCATION | FACING DIRECTION |
|---|---|---|
| PHOTO_1 | LONGITUDE, LATITUDE, HEIGHT | 270° |
| ... | ... | ... |

FIG. 9

| MAPPING ID | PHOTO ID | MAPPING FROM | MAPPING TO | DESCRIPTION |
|---|---|---|---|---|
| ID_1 | PHOTO_1 | FROM_POINT_1 | TO_POINT_1 | |
| | | FROM_POINT_2 | TO_POINT_2 | |
| | | FROM_POINT_3 | TO_POINT_3 | VERTICAL INTERSECTION OF TO_POINT_1 & CEILING PLANE |
| | | FROM_POINT_4 | TO_POINT_4 | VERTICAL INTERSECTION POINT OF TO_POINT_2 & CEILING PLANE |

FIG. 11

| MAPPING ID | PHOTO ID | MAPPING FROM | MAPPING TO |
|---|---|---|---|
| ID_1 | PHOTO_1 | FROM_POINT_1 | TO_POINT_1 |
| | | FROM_POINT_2 | TO_POINT_2 |
| | | FROM_POINT_3 | TO_POINT_3 |
| | | FROM_POINT_4 | TO_POINT_4 |
| | | : | : |

FIG. 14

| GEOMETRY | ID | DESCRIPTION | PARENT_ID | WALKABLE? | FLOOR CONN NODE |
|---|---|---|---|---|---|
| POLYGON | ID_G/F | FLOOR GEOMETRY | NULL | - | - |
| POLYGON | ID_1/F | FLOOR GEOMETRY | NULL | - | - |
| POLYGON | ID_G/F_LOBBY | INDIVIDUAL UNITS | ID_G/F | YES | - |
| LINE | ID_G/F_LOBBY_EXIT | EXIT | ID_G/F | YES | - |
| LINE | ID_1F_STAIR_EXIT | EXIT | ID_G/F | YES | YES |

FIG. 17

STREAMLINED CONSTRUCTION OF 3D BUILDING AND NAVIGATION NETWORK

FIELD OF THE INVENTION

This invention relates to mapping and navigation software, and more particularly to generation of 3D models and navigation networks of buildings.

BACKGROUND OF THE INVENTION

Two-dimensional (2D) mapping software allows for route finding and navigation within a mostly planar space such as a network of roads and highways. More recently, mapping software may include 3-Dimensional (3D) maps of buildings such as airport terminals, shopping malls, or other buildings that are accessible to the public. Virtual Reality (VR) is another application that relies upon 3D models.

Creating realistic 3D models typically involves complex procedures or experts such as software engineers or technicians. One method of generating a 3D model is to physically measure the 3D space, such as with laser rangefinders or Light Detection and Ranging (Lidar). Cameras may capture images from different viewpoints that are then analyzed to construct the 3D space, such as for Multi-View Stereo (MVS). Simultaneous Localization and Mapping (SLAM) may use inertial sensors or other device localization to determine where a device is located to build 3D maps in point clouds at the same time as cameras or Lidar measurements are taken.

These techniques may require specialized equipment, such as Lidar or multi-view camera rigs. Specialized 3D modeling or Computer-Aided Design (CAD) software such as AutoDesk, 3ds max, or Blender require expertise and understanding of 3D modeling techniques to build a realistic 3D model. Complex procedures such as using Artificial Intelligence (AI) used to convert point clouds into meaningful 3D objects and regions may produce undesirable artifacts such as merged objects that are actually separated in real space.

Generating an indoor navigation network is even more challenging than generating the 3D model. Some areas of a building may be closed off to the public, or accessible only for certain hours. A person walking on foot could change floors using an escalator, stairs, a ramp, or an elevator, so these need to be added to the 3D model to enable indoor navigation. Doors may be closed when the 3D model is generated, yet still are part of the indoor navigational network since a person can pass through the doors. Software engineers or other specialists may need to manually code these features for an indoor navigational network even after the 3D model is generated.

What is desired is an easy method to generate realistic 3D models of building interiors. A system that allows non-expert users to easily create realistic 3D models for VR and other applications is desired. It is further desired to generate indoor navigational networks for multi-floor buildings to enable 3D navigation and Virtual Reality (VR) applications.

BRIEF DESCRIPTION OF THE DRAWINGS

FIG. 3 is a flowchart of the 3D generation system converting a 2D floor plan into the 3D model for the floor.

FIG. 6 is a height input table.

FIG. 9 is a table storing photo information.

FIG. 11 shows a photo mapping table.

FIG. 14 shows a photo mapping table.

FIG. 17 is a table with floor connections.

DETAILED DESCRIPTION

The present invention relates to an improvement in 3D modeling and navigation. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described but is to be accorded the widest scope consistent with the principles and novel features herein disclosed.

Figure 1:
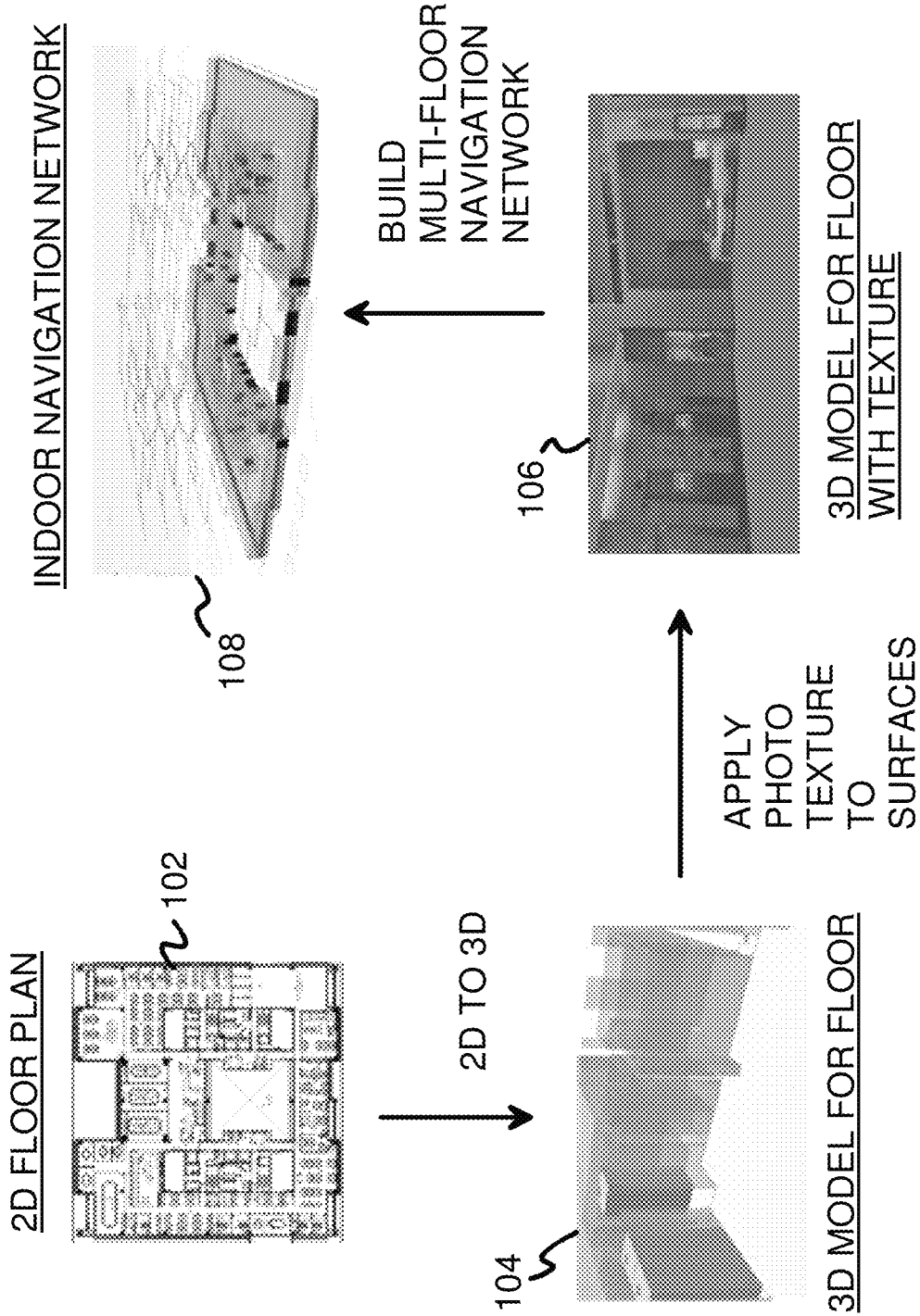
FIG. 1 shows an overall flow of a non-expert user generating a 3D model and indoor navigational network from a floor plan and photos.

FIG. 1 shows an overall flow of a non-expert user generating a 3D model and indoor navigational network from a floor plan and photos. 2D floor plan 102 is scanned in or uploaded by a user to a server. 2D floor plan 102 may be obtained from a building directory, such as those displayed to the public at shopping malls or at building lobbies, or from a building's website, or could be from construction blueprints or drawings submitted to a city's planning department. The user can also use floor plan software tools that may be available in application stores to create their own 2D floor plans. Ideally, 2D floor plan 102 can be a file in a standardized format such as Portable Network Graphic (PNG) or Geographical JavaScript Object Notation (GeoJSON).

The server is running 3D-model generation software that converts 2D floor plan 102 to 3D model for floor 104. The software can extend the walls of 2D floor plan 102 upward by a height of the ceiling to create 3D model for floor 104 from 2D floor plan 102.

The user captures images of the interior 3D space using a camera such as on a cell phone, and these photos are uploaded to the server and added as textures to the surfaces in the interior 3D space, such as to the walls. When photo textures are added to 3D model for floor 104, then the server generates 3D texture model for floor 106.

This process is repeated for several floors in a multi-floor building. Then the floors are connected to other floors by the user identifying floor-connection nodes, such as elevators, stairs, elevators, and ramps. With these floor-to-floor connections, indoor navigation network 108 can be constructed by the server. Mapping or VR software can use indoor navigation network 108 to guide a person, in the real or virtual world, through the indoor space of the building among the multiple floors and rooms.

Figure 2:
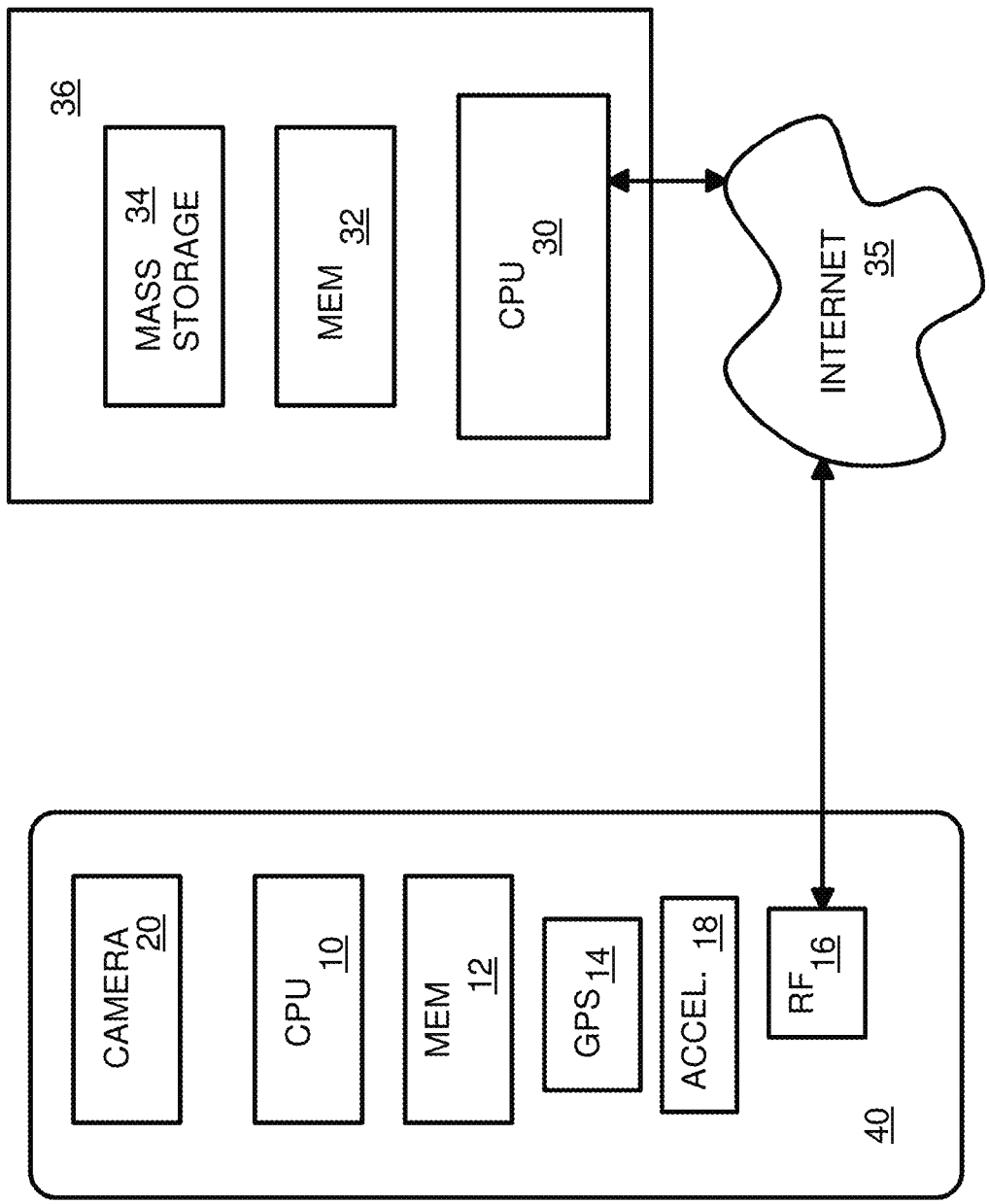
FIG. 2 shows hardware for a 3D generation system.

FIG. 2 shows hardware for a 3D generation system. This system generates 3D texture model for floor 106 and indoor navigation network 108 (FIG. 1).

Mobile device 40 can be a smartphone or tablet or similar portable device that a non-expert user carries through the building while taking photos with camera 20 that are uploaded over Internet 35 to server 36 using Radio-Frequency (RF) transceiver 16. Server 36 has Central Processing Unit (CPU) 30 or other processor(s) that execute programs stored in memory 32, such as the 3D generation software that attaches the uploaded photos to surfaces in the 3D model as textures. The resulting 3D texture model for floor 106 is stored in memory 32 and mass storage 34. Other data and structures, such as 2D floor plan 102, 3D model for floor 104, and indoor navigation network 108 can be stored or modified in memory 32 and backed up to mass storage 34.

Mobile device 40 has its own CPU 10 that executes programs stored in memory 12, such as client programs that allow the user of mobile device 40 to specify ceiling heights, elevators, stairs, ramps, and escalators that connect floors, and map photos taken by camera 20 to specific locations within 3D model for floor 104. These details from the user allow the 3D generation software running on server 36 to build 3D texture model for floor 106 and indoor navigation network 108.

Global Positioning System (GPS) 14 can tag each photo taken by camera 20 with the physical x, y, z location of mobile device 40 when the photo was taken, and accelerometers 18 can identify the orientation of mobile device 40 and its camera 20 when the photo was taken. This positioning and orientation information can be sent to server 36 to position the photo on the correct surface within the 3D space.

FIG. 3 is a flowchart of the 3D generation system converting a 2D floor plan into the 3D model for the floor. The user obtains and uploads 2D floor plan 102 to the server, step 402, along with a general location of the building, such as its street address and city. The server receives the floor plan, step 410 and sends a base map of the area around the building to the user, step 412.

The user aligns 2D floor plan 102 to the base map from the server, step 406, and sends geo-coordinates such as corners of the building on 2D floor plan 102 that are aligned to the base map. This allows the server to more precisely align 2D floor plan 102 to its existing base map.

The server then converts 2D floor plan 102 to a vectorized geometries in a 2D space (plane), step 414. Rooms can be converted to polygons, and doors can be converted to lines, as a few examples.

The user then manually inputs various data to the server, step 408. The user can be shown a table and can input into this table various parameters. These parameters can include the floor base height compared to the street level, the ceiling height above the floor, and a distance between the false ceiling and the next floor above, or an overall height of each floor, such as a number of meters. The user can estimate these values if direct measurements cannot be taken.

The user can also specify walkable areas. Some rooms may be closed off to the public and are not walkable, or physical barriers may exist, or an atrium or other area within 2D floor plan 102 may have no walkable floor on the current floor level.

The server then converts the vectorized floor plan generated from 2D floor plan 102 into 3D model for floor 104, step 416. For example, walls can be extended upward from the plane of the vectorized 2D floor plan by the height specified in step 408 to create a 3D space from the 2D vector model.

Figure 4:
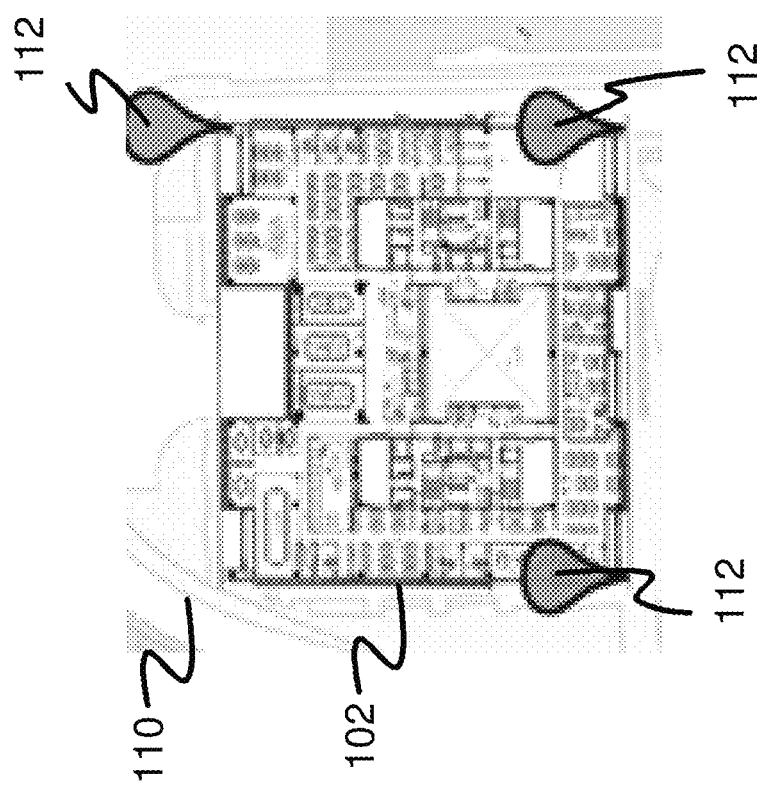
FIG. 4 shows a geo-referenced floorplan.

FIG. 4 shows a geo-referenced floorplan. The user uploads to the server 2D floor plan 102, which can be in a standardized file format such as PNG or GeoJSON or converted to the standardized file format. The server displays base map 110 with 2D floor plan 102 overlaid. Base map 110 will have the outline of the building displayed from larger-scale imaging such as aerial or satellite photographs.

The user can move 2D floor plan 102 relative to base map 110, such as by dragging or using cursors, and can re-size or rotate 2D floor plan 102 as needed to match the outline of the building on basemap 110 with 2D floor plan 102.

Once aligned, the server designates geocoordinates 112, such as at the corners of the building. Geocoordinates 112 are the geographical coordinates in the global coordinate system, such as used by GPS, for one or more of the corners of the building. 2D floor plan 102 has these coordinates assigned to its corresponding corners.

Figure 5:
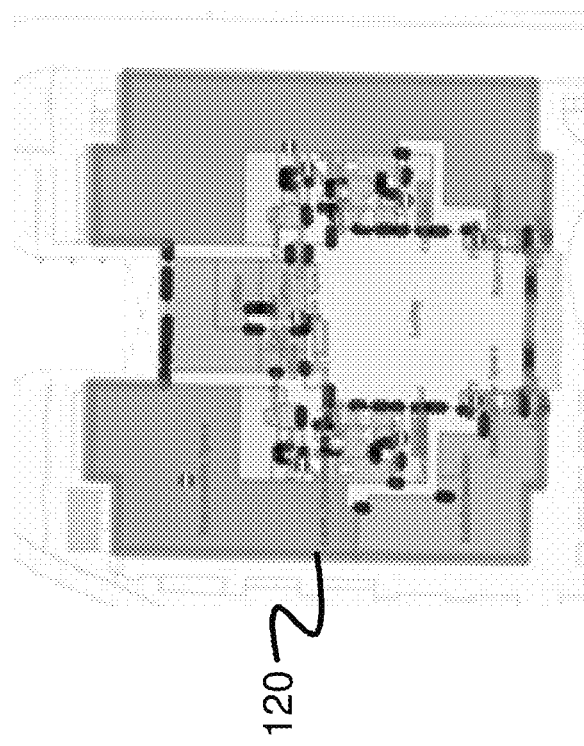
FIG. 5 shows a vectorized 2D floor plan.

FIG. 5 shows a vectorized 2D floor plan. Once the user has aligned 2D floor plan 102 to base map 110, the server converts 2D floor plan 102 to vectorized geometries 120.

Vectorized geometries 120 can include many polygons and lines to match the building layout information in 2D floor plan 102. Polygons can be generated for overall floor geometries, for individual rooms and corridors, and other features found in 2D floor plan 102. Line geometries are created for other features in 2D floor plan 102, such as doors and exits. Exits can include elevators, stairs, and ramps to other levels as well as doors.

FIG. 6 is a height input table. The server generates polygon and line geometries when converting 2D floor plan 102 to vectorized geometries 120. These polygons and lines are listed in a table that is displayed to the user on a display screen on mobile device 40. Each polygon or line is assigned an identifier by the server, such as ID_G/F for the overall floor geometry for the Ground Floor, or ID_G/F_LOBBY_EXIT for a line geometry of the lobby exit of the building. The server can display a description of the geometry in the table, such as INDIVIDUAL UNITS for polygons of individual rooms, such as the lobby, or EXIT for line exits. The user may need to edit these descriptions, such as to designate which doors are exits and which are locked, such as to maintenance rooms.

The server can maintain a hierarchy of the polygons and lines. The parent ID field can indicate the parent, such as the overall floor geometry for the floor that the exit or room is on.

The user enters height data into the table displayed from the server. The server could pre-populate the table with suggested or guessed heights that the user can verify or over-write as needed, or the user could input the heights directly, such as in meters. The user could physically measure these heights, or could estimate them, or may have these heights from reliable data sources such as the building plans.

The user enters the base floor height relative to the ground outside the building. In this example the ground floor height is 0, level with the outside ground, while the next floor, the first floor, is at 4 meters above the ground. The height entered by the user for a floor could be copied to all features in the hierarchy for that floor, rather than have the user manually enter the same height for all polygons and lines on that floor. The user could also adjust any heights as needed, such as for a raised floor area in one of the rooms on a floor.

The user also enters the floor height for each floor. The floor height is the distance from the floor to the next floor. In this example each floor is 4 meters, about 12 feet, floor-to-floor.

The user can also enter the visible or false ceiling height. The floor height includes the visible height to the false ceiling, and a height between the ceiling and the next floor, where utilities such as wiring and plumbing are often located along with the building structure. In this example there is 1 meter of hidden height and 3 meters of visible height. The user enters 3 meters for the false ceiling height and 4 meters for the floor height.

The server may perform various error checking on these user-entered heights and flag any irregularities to the user to check for errors. Some line geometries may not be of the full floor height, such as doors. The user could enter the height of the doors, or the server could later estimate or adjust these heights based on photos submitted by the user. The server could also use a default door height, and later adjust individual door heights based on photos submitted by the user.

Figure 7:
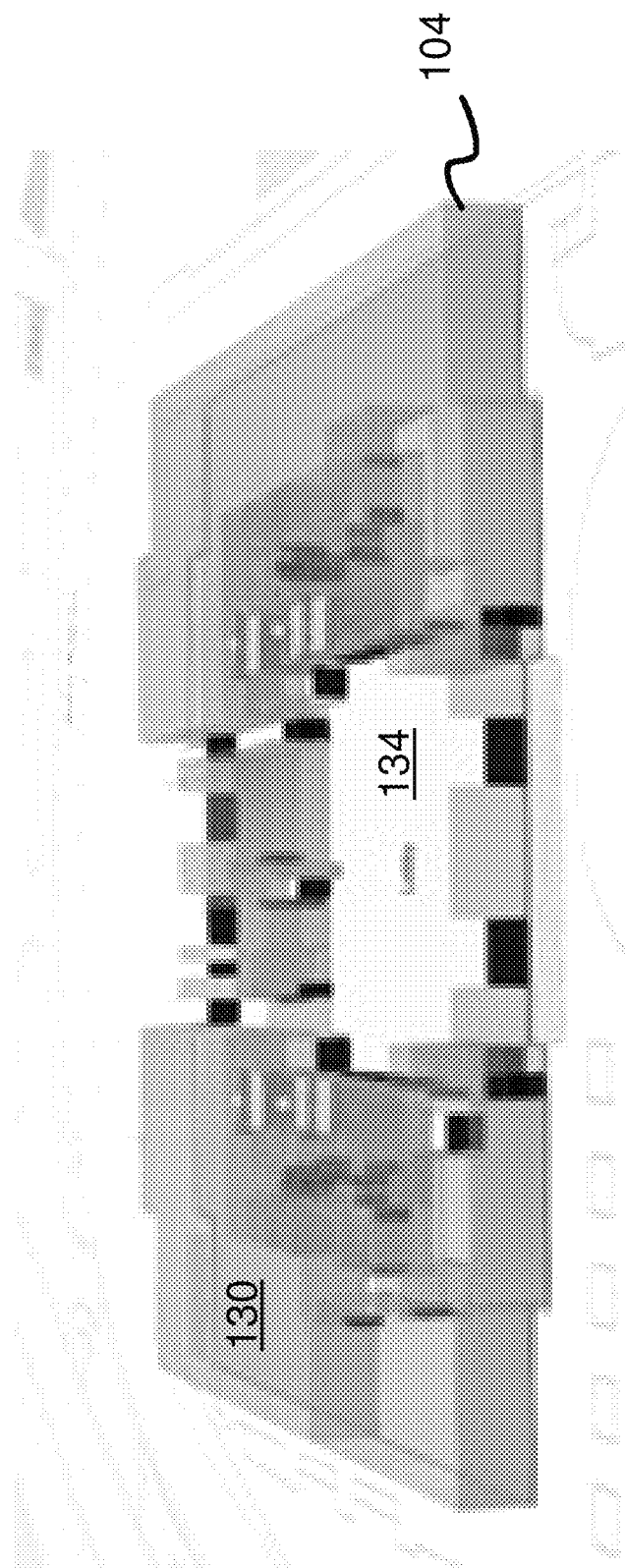
FIG. 7 shows a basic 3D model for a floor that is generated from the user-input heights and the vectorized geometries.

FIG. 7 shows a basic 3D model for a floor that is generated from the user-input heights and the vectorized geometries. The server starts with the planar polygon and line geometries in vectorized geometries 120 that was generated from 2D floor plan 102 and extends or extrudes each planar geometry upward by the height the user entered into the table (FIG. 6) to generate the walls. Ceilings are generated on a plane parallel to the floor plane, but at a height above the floor defined by the false ceiling height for that floor. The next floor will be located at a height defined by the floor height.

Thus 2D floor plan 102 is converted to 3D model for floor 104 by extruding walls based on the user-input heights from the table. 3D model for floor 104 may include walkable room 134, such as a lobby that is open to the public and walkable, and hidden or closed room 130 that is not open to the public and is not walkable. Other criteria could be used to define walkable and non-walkable areas. For example, some users, such as employees of a company, could have room 130 as walkable, while other users see room 130 as non-walkable. Maintenance and utility rooms could be non-walkable for all users except building maintenance workers.

Figure 8:
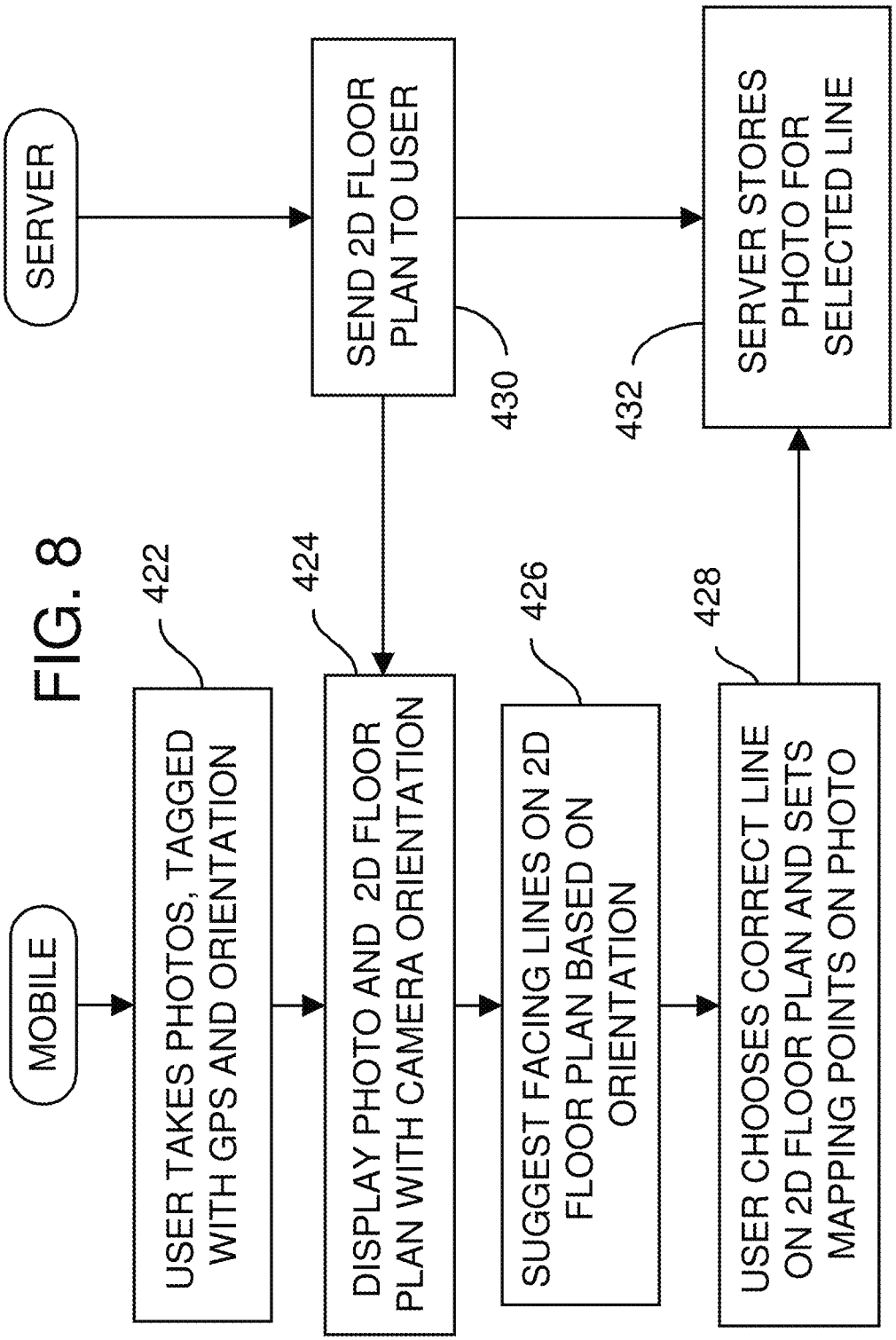
FIG. 8 is a flowchart of a user adding a photo as a texture to wall surface using the 2D floor plan.

FIG. 8 is a flowchart of a user adding a photo as a texture to wall surface using the 2D floor plan. Using mobile device 40, the user takes a photo with the camera, which is tagged with the GPS coordinates and the camera orientation, step 422. The photo is displayed back to the user on his mobile device, step 424, along with a portion of 2D floor plan 102 sent by the server, step 430. The camera orientation is also displayed over 2D floor plan 102. Based on the camera orientation, suggested facing lines are highlighted or otherwise displayed on 2D floor plan 102 to the user, step 426. The user then selects one of the suggested facing lines, step 428. The user also sets or moves mapping points that are superimposed over the photo displayed back to the user, step 428. The selection of the facing line, and the mapping points within the photo, are sent from the mobile device to the server. The server then stores the photo, its mapping points, and the selected facing line, step 432. The photo is associated with the selected facing line, such as with a link, and the server can apply the photo as a texture for the surface extruded from the line in 3D model for floor 104 when generating 3D texture model for floor 106 (FIG. 1).

This process can be repeated for other photos, orientations, and GPS locations as the user walks around the floor being 3D-model generated.

FIG. 9 is a table storing photo information. Each photo taken by the user is assigned an identifier, such as PHOTO_1. The GPS location, such as latitude, longitude, and height (Z) are stored, along with the orientation of the camera or mobile device. The orientation may be determined from an inertial tracker or accelerometer.

FIGS. 10A-10E detail the user mapping a photo to lines in the 3D model for the floor. 3D model for floor 104 will have no texture, or a default or plain texture, assigned to each surface, such as for each wall, floor, and ceiling. The user captures a photo and defines how this photo fits within 3D model for floor 104. Then the photo is used as texture for a surface within 3D model for floor 104 to create 3D texture model for floor 106 (FIG. 1).

Figure 10A:
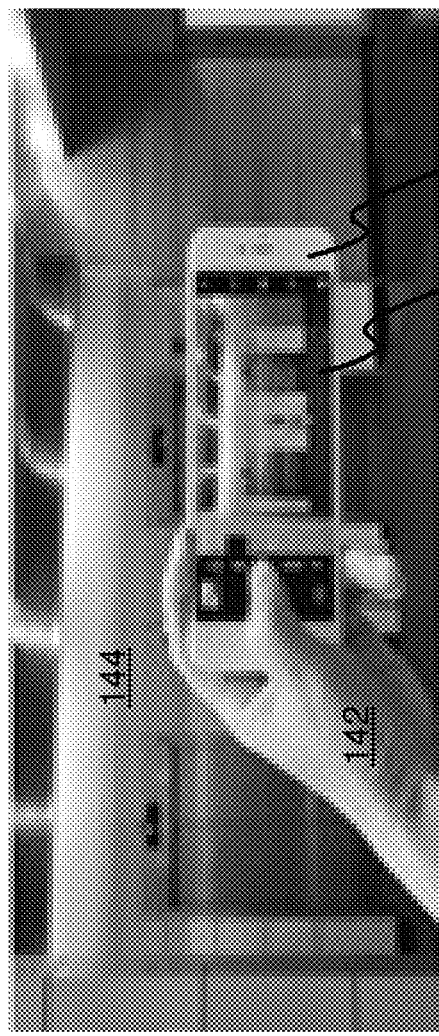
FIGS. 10A-10E detail the user mapping a photo to lines in the 3D model for the floor.

In FIG. 10A, user 142 uses mobile device 40 to capture a photo of wall 144 within the building's interior. The image of wall 144 appears on display 140 of mobile device 40, allowing the user to adjust the orientation to best capture wall 144. The GPS location and orientation are sent along with the photo to the server. The server locates the GPS location within vectorized geometries 120 generated from 2D floor plan 102 and sends a portion of 2D floor plan 102 around this GPS location back to mobile device 40. In FIG. 10B, this floor-plan portion 150 of 2D floor plan 102 is displayed to the user.

Figure 10C:
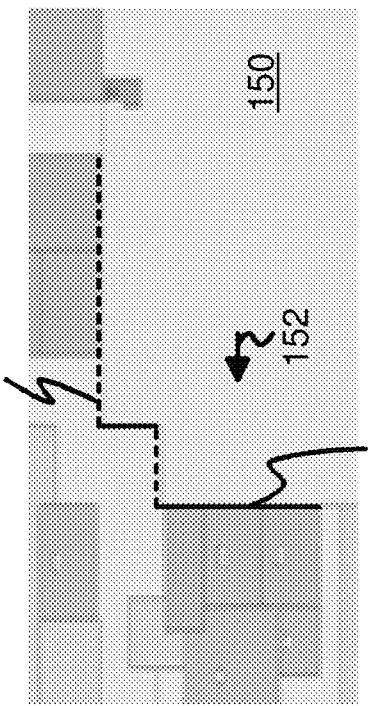
Figure 10B:
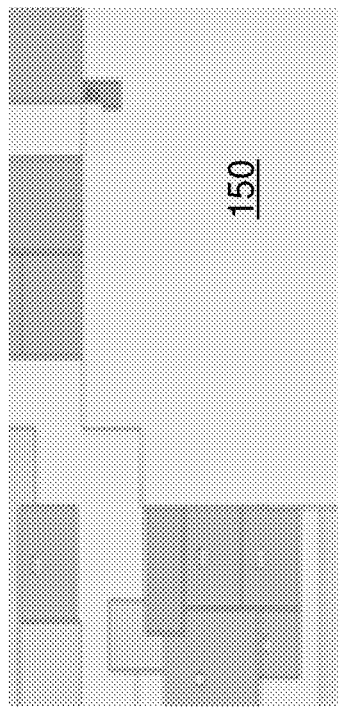

In FIG. 10C, the server also displays camera orientation 152 on top of floor-plan portion 150 at the GPS location of mobile device 40. Based on the GPS location and camera orientation, the server highlights facing wall 154 and possibly other walls 156 that may be in the user's field of view. The user then selects or confirms which wall is being photographed, such as facing wall 154.

Figure 10D:
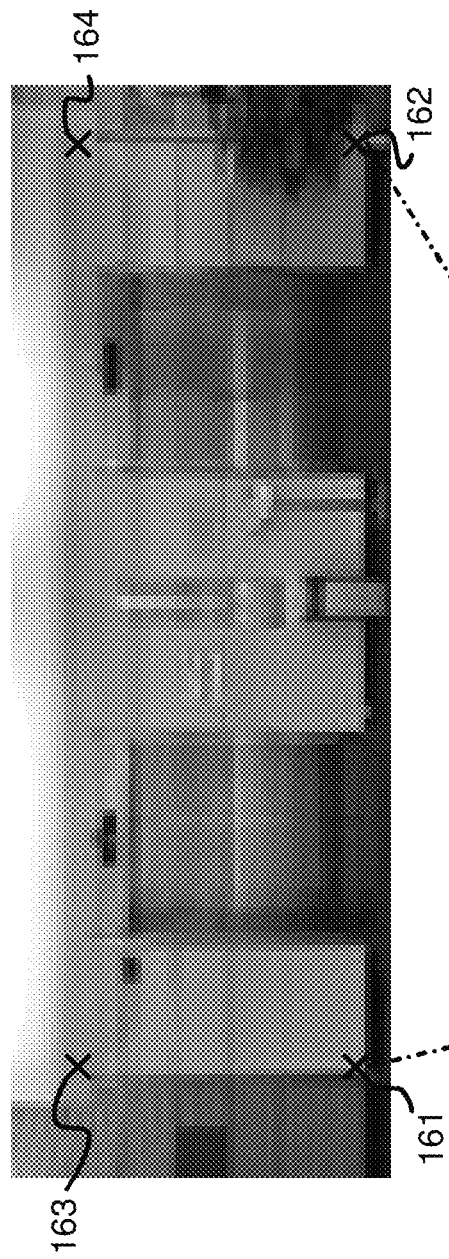

In FIG. 10D, the photo is displayed on the display screen of mobile device 40, along with four points 161-164. These points can be moved by the user, such as by dragging them or using a cursor. The user moves point 161 to the lower left corner of the image of wall 144, and then moves point 162 to the lower right corner of the image of wall 144, moves point 164 to the upper right corner of the image of wall 144, and moves point 163 to the upper right corner of the image of wall 144.

Figure 10E:
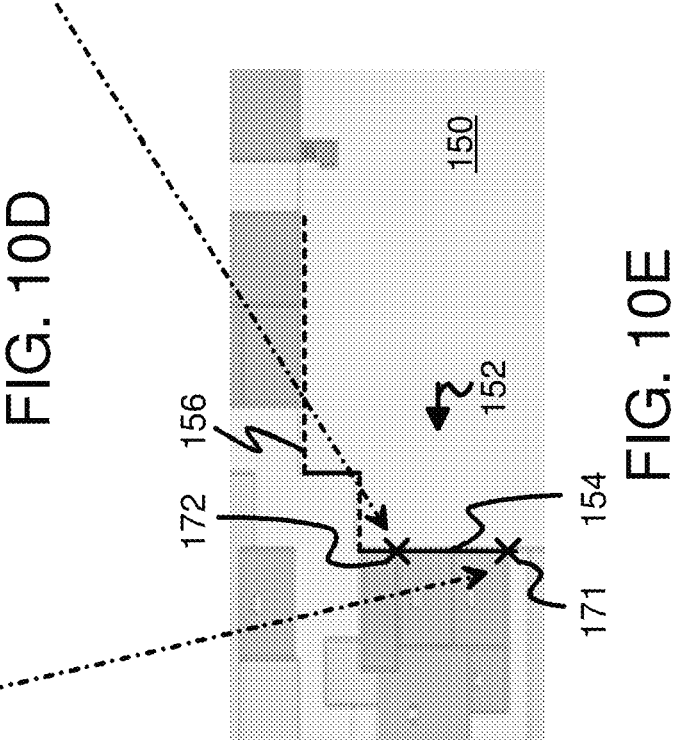

In FIG. 10E, floor-plan portion 150 is displayed on mobile device 40 to the user. Model points 171, 172 are displayed on facing wall 154. Model point 171 corresponds to mapping points 161, 163 in the photo projected into the 2D space of floor-plan portion 150, while model point 172 corresponds to mapping points 162, 164 in the photo. The user can move model points 171, 172 within floor-plan portion 150 to the corresponding locations of mapping points 161-164 in the photo. Once model points 171, 172 are in the correct locations, the user can confirm the placement and the locations of model points 171, 172 are sent to the server.

FIGS. 10D, 10E could be displayed simultaneously to the user, or could be displayed successively. The user could switch between the 2 displays, such as by using a hot key combination.

FIG. 11 shows a photo mapping table. The photo taken by the user, such as in FIG. 10A, is identified by a photo identifier such as PHOTO_1. The mapping of mapping points 161-164 in this photo with model points 171, 172 in 3D model for floor 104 is assigned a mapping identifier, ID_1. Each photo could have more than 4 mapping points, and could have more than one selected wall, such as facing wall 154.

The "mapping from" column has four rows, for mapping points 161, 162, 163, 164 in the photo (FIG. 10D). The "mapping to" column also has four rows, for model points 171, 172, (FIG. 10E) on the floor, and for and the ceiling intersection with vertical lines rising from model points 171, 172. The "mapping to" column is for model points 171, 172 in floor-plan portion 150 of 2D floor plan 102. Thus the table shows correspondence of mapping points 161-164 in the photo to model points 171, 172 in 2D floor plan 102 and their ceiling points above them in 3D model for floor 104.

Figure 12:
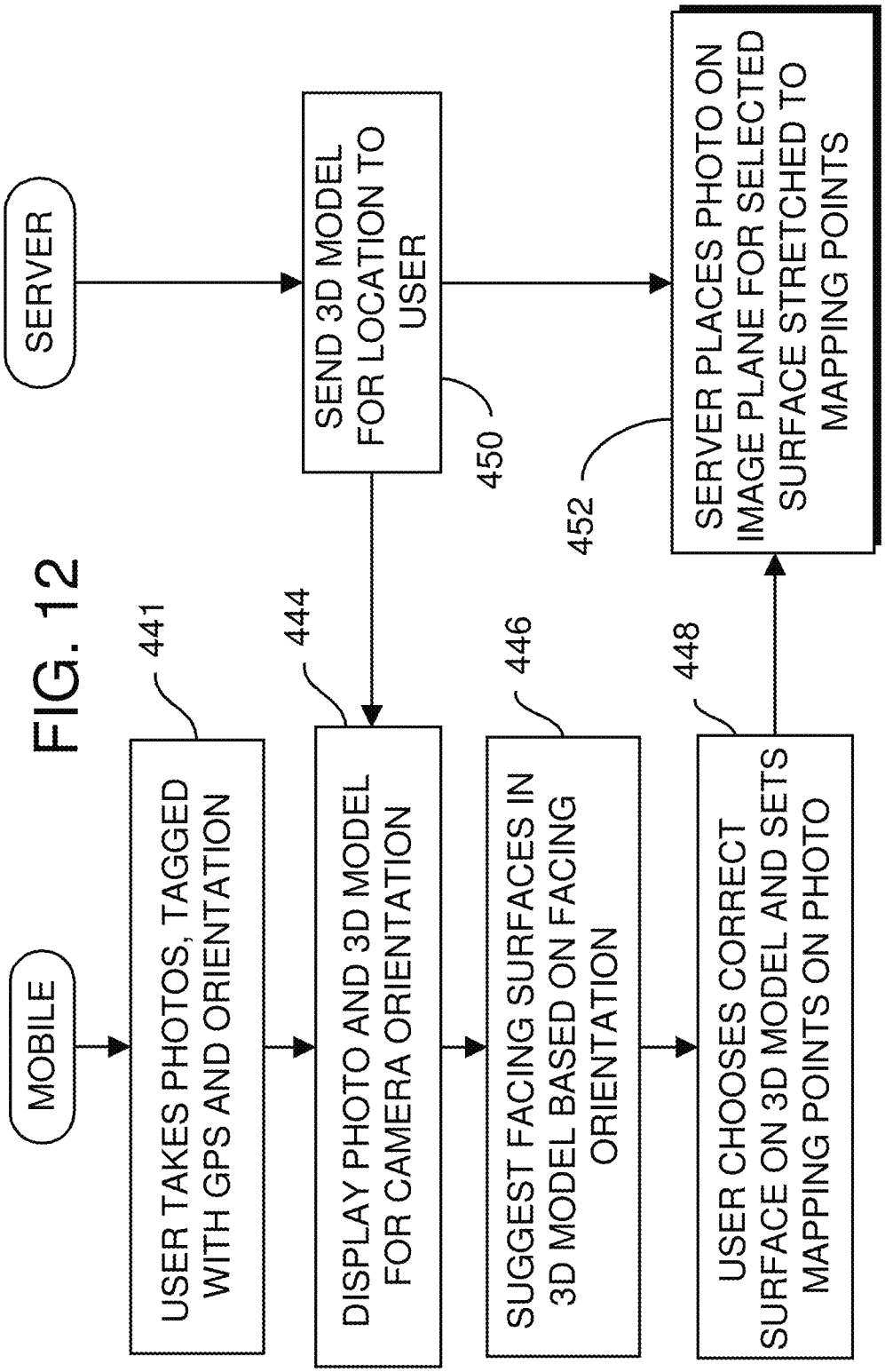
FIG. 12 is a flowchart of a user adding a photo as a texture to a wall surface using the 3D model.

FIG. 12 is a flowchart of a user adding a photo as a texture to a wall surface using the 3D model. Using mobile device 40, the user takes a photo with the camera, which is tagged with the GPS coordinates and the camera orientation, step 441. The photo is displayed back to the user on his mobile device, step 444, along with a portion of 3D model for floor 104 sent by the server, step 450. The camera orientation is used by the 3D viewer app on mobile device 40 to adjust the orientation displayed to the user based on the orientation of mobile device 40 when the photo was captured, such as with a VR viewer app.

Based on the camera orientation, suggested facing surfaces are highlighted or otherwise displayed or indicated to the user by the 3D viewer app using 3D model for floor 104, step 446. The user then selects one of the suggested facing surfaces, step 448. The user also sets or moves mapping points that are superimposed over the photo displayed back to the user, step 448. The selection of the facing surface, and the mapping points within the photo, are sent from the mobile device to the server. The server then stores the photo, its mapping points, and the selected facing surface, step 452. The photo is placed on the image plane for the selected facing surface, such as with a link, so that the server applies the photo as a texture for the surface in 3D model for floor 104 when generating 3D texture model for floor 106 (FIG. 1). The photo may be stretched, resized, or rotated to fit the selected facing surface bounded by the mapping points.

This process can be repeated for other photos, orientations, and GPS locations as the user walks around the floor being 3D-model generated.

FIGS. 13A-13E detail the user mapping a photo to a surface in the 3D model for the floor. 3D model for floor 104 will have no texture, or a default or plain texture, assigned to each surface, such as for each wall, floor, and ceiling. The user captures a photo and defines how this photo fits within 3D model for floor 104. Then the photo is used as texture for a surface within 3D model for floor 104 to create 3D texture model for floor 106 (FIG. 1).

Figure 13A:
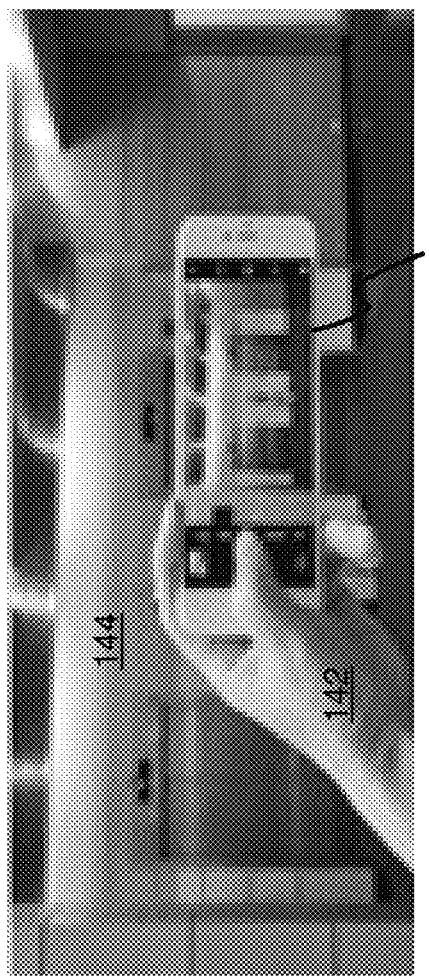
FIGS. 13A-13E detail the user mapping a photo to a surface in the 3D model for the floor.

In FIG. 13A, user 142 uses mobile device 40 to capture a photo of wall 144 within the building's interior. The image of wall 144 appears on display 140 of mobile device 40, allowing the user to adjust the orientation to best capture wall 144. The GPS location and orientation are sent along with the photo to the server.

Figure 13C:
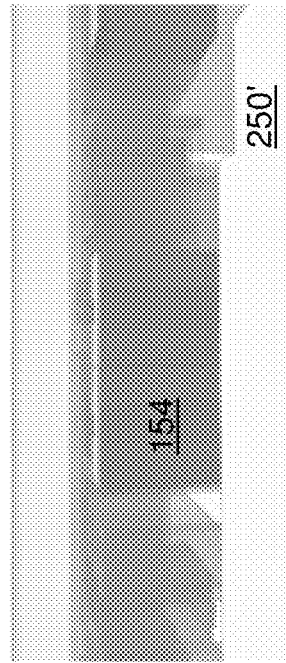
Figure 13B:
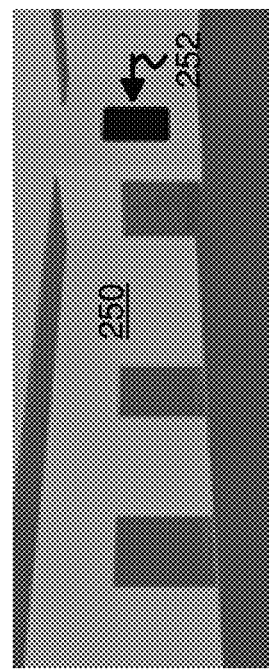

In FIG. 13B, the server locates the GPS location where the photo was captured within 3D model for floor 104, and the 3D viewer app is set to display from this location within the 3D model. The current pointing direction of the mobile device is used to set the orientation of the 3D model, and the 3D viewer of the mobile device displays the proper orientation within 3D model for floor 104 to the user as virtual 3D display 250. Camera orientation 252 may also be displayed within virtual 3D display 250.

In FIG. 13C, the server highlights facing wall 154 within virtual 3D display 250'. The user may move or change orientation of mobile device 40 to better capture a photo of facing wall 154, and virtual 3D display 250' is adjusted for these movements.

Based on the GPS location and camera orientation, the server highlights facing wall 154 and possibly other walls 156 that may be in the user's field of view. The user then selects or confirms which wall is being photographed, such as facing wall 154.

Figure 13D:
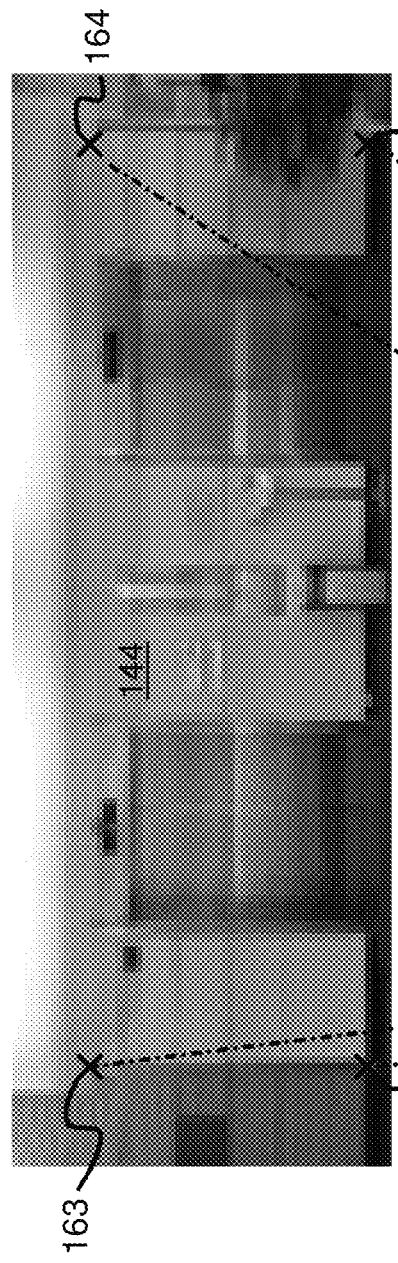

In FIG. 13D, the photo is displayed on the display screen of mobile device 40, along with four points 161-164. These points can be moved by the user, such as by dragging them or using a cursor. The user moves point 161 to the lower left corner of the image of wall 144, and then moves point 162 to the lower right corner of the image of wall 144, moves point 164 to the upper right corner of the image of wall 144, and moves point 163 to the upper right corner of the image of wall 144.

Figure 13E:
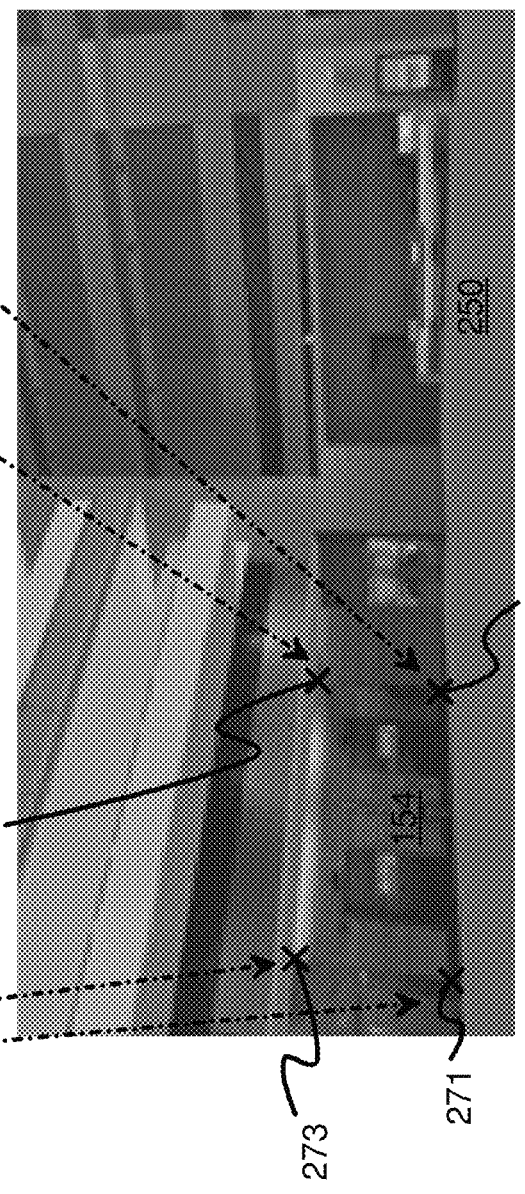

In FIG. 13E, virtual 3D display 250 is displayed on mobile device 40 to the user. Points 271, 272, 273, 274 are displayed on facing wall 154. The user can move points 271, 272, 273, 274 within virtual 3D display 250 to the corresponding locations of points 161-164 in the photo. Once points 271-274 are in the correct locations, the user can confirm the placement and the locations of points 271-274 are sent to the server.

FIG. 14 shows a photo mapping table. The photo taken by the user, such as in FIG. 13A, is identified by a photo identifier such as PHOTO_1. The mapping of mapping points 161-164 in this photo with model points 271-274 in 3D model for floor 104 is assigned a mapping identifier, ID_1. Each photo could have more than 4 mapping points, and could have more than one selected wall, such as facing wall 154.

The "mapping from" column has four rows, for mapping points 161, 162, 163, 164 in the photo (FIG. 13D). The "mapping to" column also has four rows, for model points 271, 272, 273, 274 (FIG. 13E) on facing wall 154. The table shows correspondence of mapping points 161-164 in the photo to model points 271-274 in 3D model for floor 104.

The server uses the mapping points and the photo to create an image plane. The image plane with the resized photo is placed on top of the original plain surface for facing wall 154. Since the photo is more realistic than a plain surface, 3D texture model for floor 106 is more realistic than 3D model for floor 104 since it includes photos as textures for surfaces within the 3D space.

Figure 15:
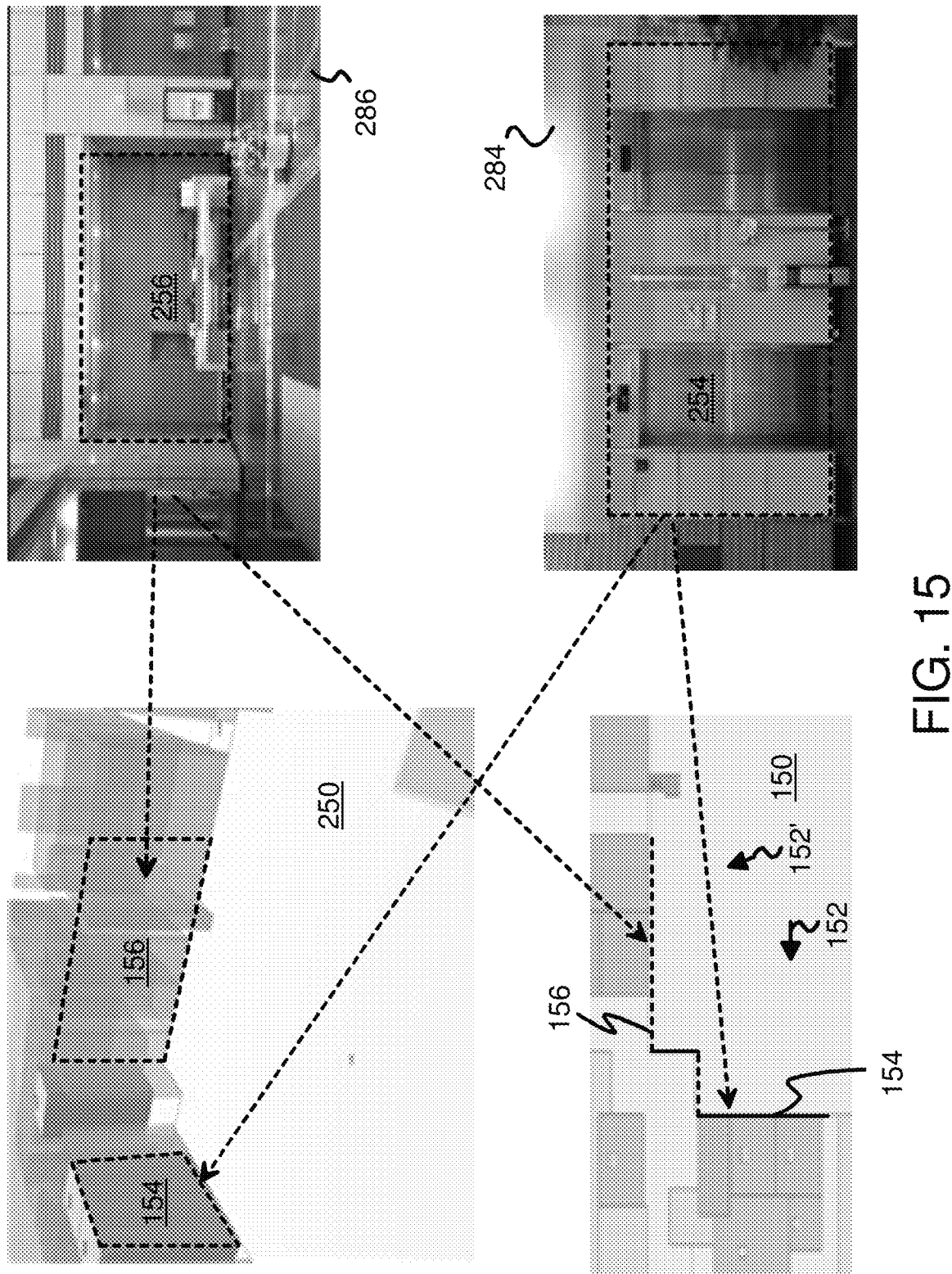
FIG. 15 shows interactively mapping photos to walls within the 3D texture model for a floor using both 2D and 3D photo mapping.

FIG. 15 shows interactively mapping photos to walls within the 3D texture model for a floor using both 2D and 3D photo mapping. Ceilings, floors, and other surfaces can be similarly mapped with photos. 2D photo mapping was shown in FIGS. 8-11 while 3D photo mapping was shown in FIGS. 12-14.

Mobile device 40 displays floor-plan portion 150 to the user, with facing wall 154 and other wall 156 shown. The user selects facing wall 154 and takes photo 284 with wall image 254, and moves the corner points for wall image 254. The server applies as texture to the image plane for facing wall 154 the area inside the dashed box having the four points moved by the user.

The user turns to move from camera orientation 152 to camera orientation 152'. Then the user switches to 3D mode, and virtual 3D display 250 is displayed on mobile device 40 instead of floor-plan portion 150 of 2D floor plan 102. Wall image 254 is displayed for facing wall 154 in virtual 3D display 250. The user has turned to face other wall 156, and takes photo 286. The user moves the four mapping points to the corners of other wall 156 to define other wall image 256 inside photo 286. These mapping points are used to crop photo 286, and the cropped photo is applied as texture to the image plane for other wall 156, and can be displayed for other wall 156 in virtual 3D display 250.

Figure 16:
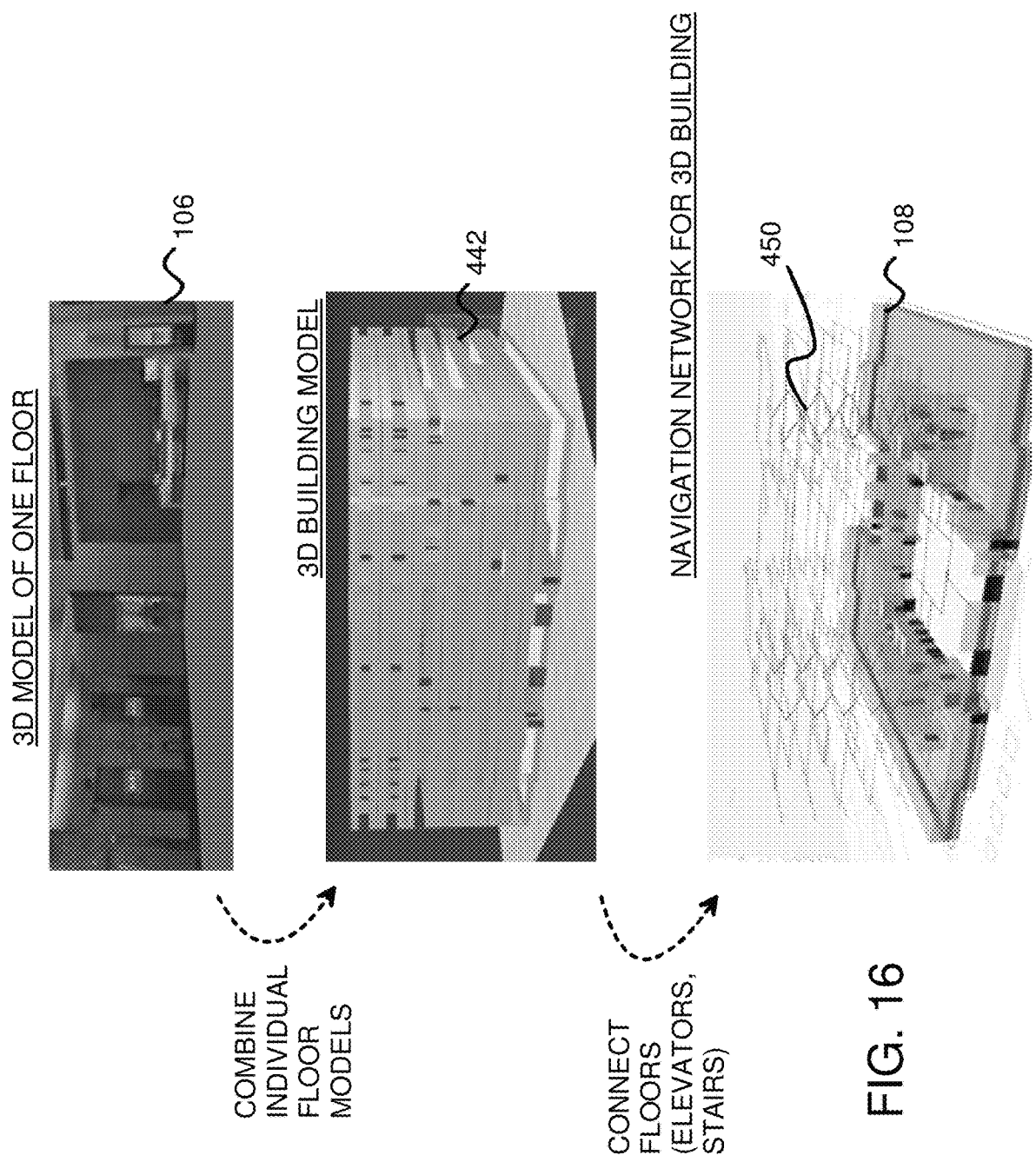
FIG. 16 highlights connecting several of the 3D texture model for individual floors to generate an indoor navigation network.

FIG. 16 highlights connecting several of the 3D texture model for individual floors to generate an indoor navigation network. The user uploads 2D floor plan 102, inputs heights, takes photos, and sets their mapping points to allow the server to generate 3D texture model for floor 106. This is repeated for many floors in the building. Each floor has its own 3D texture model for floor 106. Walkable areas within each floor are linked together into a walkable network for that floor.

The individual floor models and walkable networks are stacked on top of each other, using the floor height input by the user in the table of FIG. 6. For example, 3D texture model for floor 106 for the first floor is placed at the floor height above 3D texture model for floor 106 for the ground floor, and 3D texture model for floor 106 for the second floor is placed at the floor height above 3D texture model for floor 106 for the first floor. Geocoordinates 112 were entered for each floor when aligning 2D floor plan 102, so the floors will align to each other.

By stacking 3D texture model for floor 106 for all individual floors, 3D building model 442 is obtained. However, there are no defined connection between the walkable networks on different floors. The user also inputs floor connection nodes, such as stairs, escalators, ramps, and elevators, indicating their locations by selecting line geometries or locations in 3D texture model for floor 106, and also indicating what floors are connected by each elevator or stairs. Once connections such as stairs 450 between floors have been defined, the server connects a pair of 3D texture model for floor 106 at the defines floor connection point and indicates the connection point as walkable, so that a person can navigate between floors. The server thus generates indoor navigation network 108.

FIG. 17 is a table with floor connections. The geometry identifiers, descriptions, and parent identifiers are as described earlier for FIG. 6. The user can set a walkable flag or indictor for some geometries to indicate that they represent areas where walkable paths can pass through, enabling a navigation app to generate a walking path or route through that geometry. For example, the lobby on the ground floor has been flagged as walkable, as well as the lobby exit and the stairs between the ground floor and the first floor. The lobby is a polygon, while the lobby exit and stairs are lines within 3D texture model for floor 106 for the ground floor.

A floor connection node flag is also shown in the last column of the table. This floor connection node is set for the last row of the table, for the stairs between the ground and first floors. The server uses the floor connection flags to use that row's geometry to connect to another floor within indoor navigation network 108.

Figure 18:
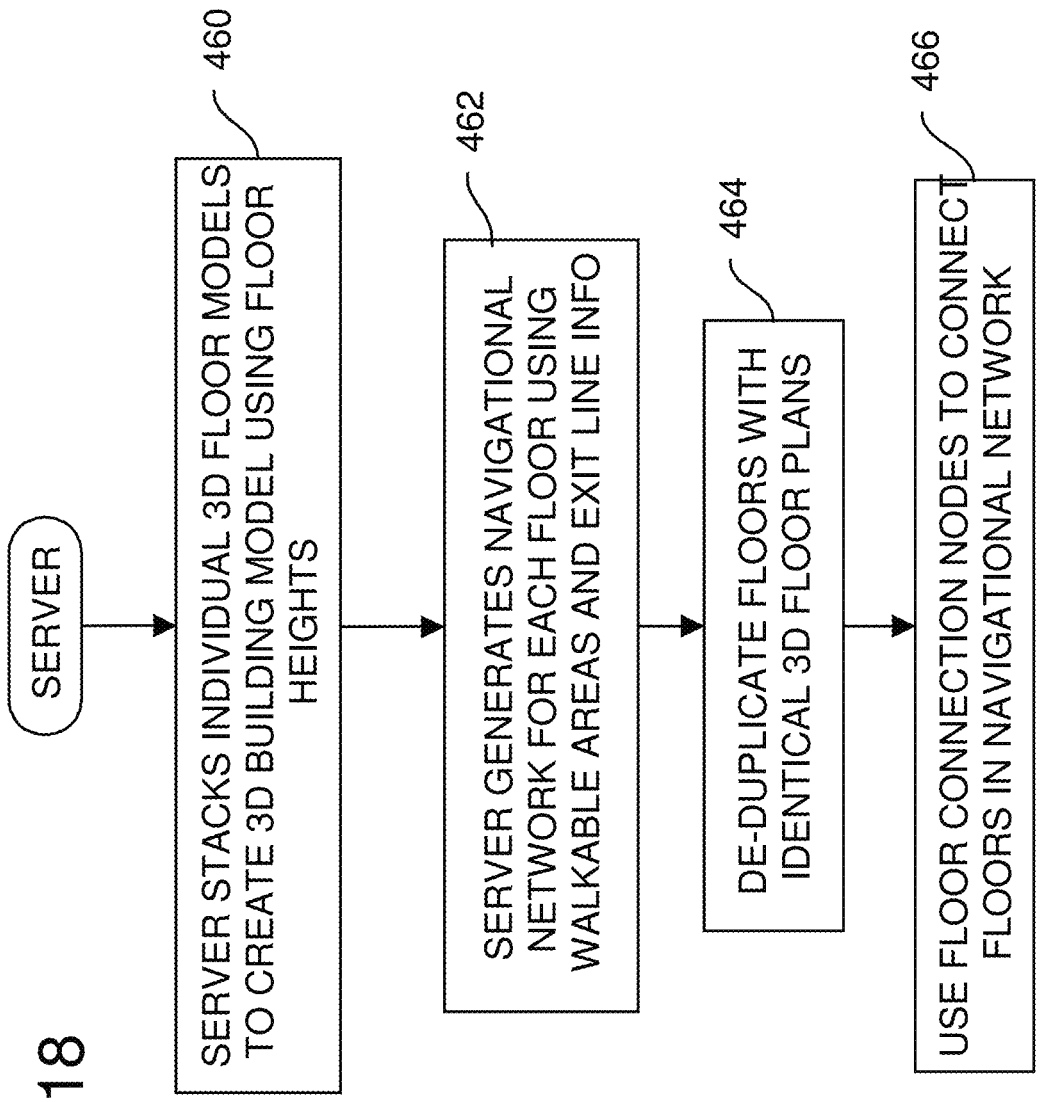
FIG. 18 is a flowchart of the server generating the indoor navigation network by stacking the 3D texture models for the floors and from the floor connection nodes from the table of FIG. 17.

FIG. 18 is a flowchart of the server generating the indoor navigation network by stacking the 3D texture models for the floors and from the floor connection nodes from the table of FIG. 17. The server has several 3D texture model for floor 106 for several floors in a building. Each 3D texture model for floor 106 was aligned to geocoordinates 112 so the individual floor models occupy the same footprint on the basemap, but are at different heights (Z values). Using the floor heights from the table of FIG. 6, the server places these individual 3D texture model for floor 106 at different Z values to create 3D building model 442 (FIG. 16), step 460. The floor of the ground floor is placed at the floor base level that the user input in the table of FIG. 6, while other floors are stacked on top, with their floor levels placed at the floor height (entered into the table of FIG. 6) above the prior floor.

The server then searches the table of FIG. 17 for all rows for a specific floor. The polygons and lines that are flagged as walkable in the table for that floor are linked together in a walkable network for that floor. For example, polygons for walkable rooms such as the lobby and bathrooms are linked together along with exit lines such as for the front door and elevators. This is repeated for each of the other floors, step 462.

Many tall buildings have many floors that have identical floor plans. For example, a high-rise apartment building may have a unique ground floor plan with a lobby, and a unique top floor with a larger penthouse suite, but the middle floors all have the same floor plan of smaller apartments. The server compares floor plans for each floor and removes duplicates having the same pattern for 3D texture model for floor 106. Using de-duplication process 464 can significantly reduce the storage requirements for indoor navigation network 108. Each of the duplicate middle floors can link to a same 3D texture model for floor 106 for this duplicated floor plan.

The server then searches the table of FIG. 17 for floor connection nodes. For each floor connection node, a walkable link is made from the exit line in one 3D texture model for floor 106 to an exit line in another 3D texture model for floor 106 for a different floor. These exit lines can be doors to elevators, stairs, or the start or end of an escalator. These walkable links are linked together with network of walkable links for each floor to form a walkable network, step 466.

Figure 19:
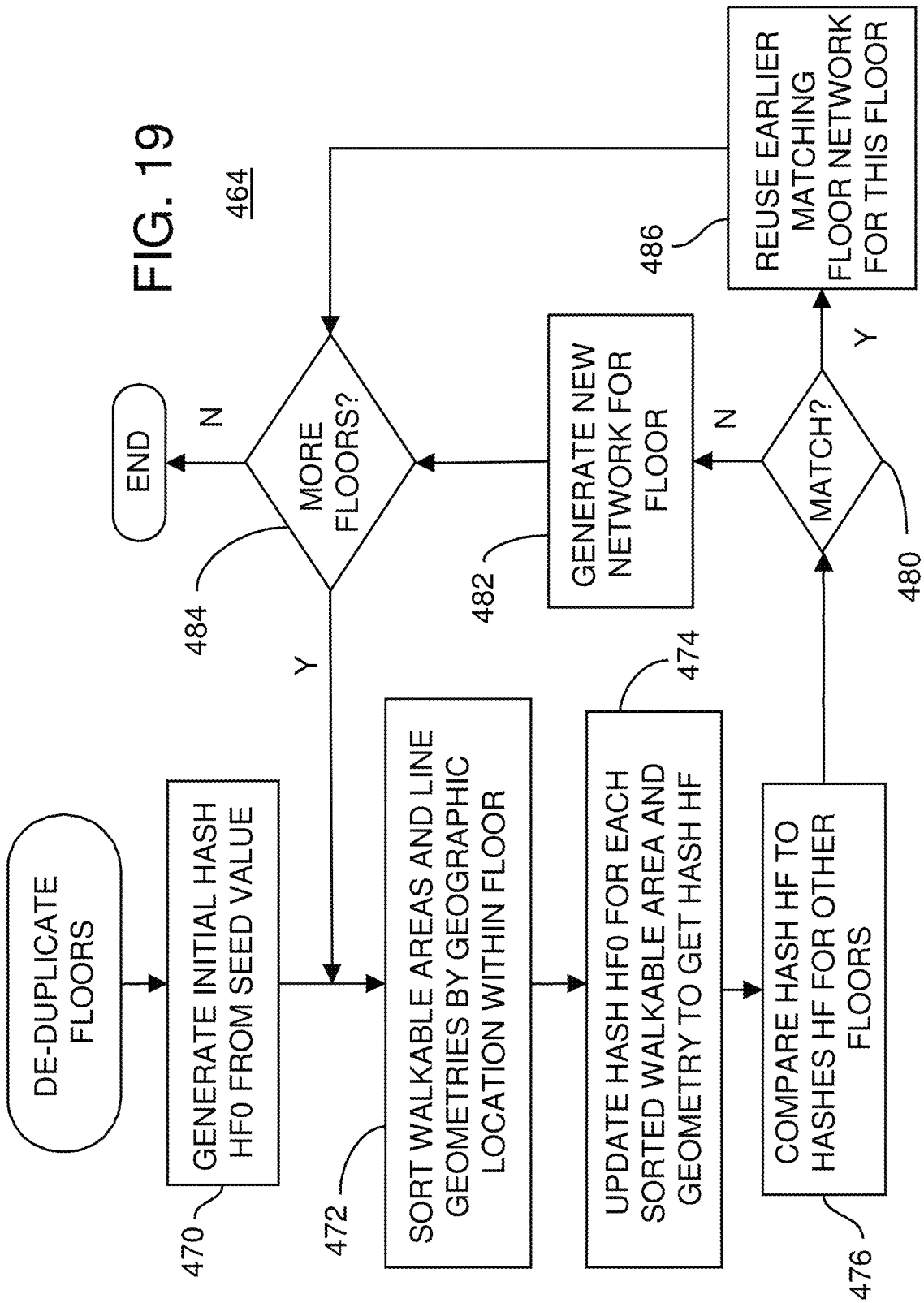
FIG. 19 is a flowchart of a floorplan deduplication procedure using hashes.

FIG. 19 is a flowchart of a floorplan deduplication procedure using hashes. The deduplication process of FIG. 19 is called by deduplication process 464 of FIG. 18.

An initial hash value is created from a seed, step 470. For example, initial has value Hf0=crypto.createHash('sha256') can be used to create an initial cryptographic hash using the Secure Hash Algorithm 256 (SHA256) standard.

The walkable areas and exit lines or other walkable line geometries are sorted based on their geographic location within that floor, such as their X, Y locations, step 472. The textual representation of these walkable areas and lines, such as coding or identifiers stored in a table or database, are input to the hash engine in the sort order, step 472, to update the initial hash for all walkable geometries. A final hash Hf is generated after these hash updates.

This final hash Hf for the current floor is compared to the final hash Hf (i) for all other floors in the building, step 476. When a match is found, step 480, the current floor is considered to be a duplicate. The data stored for the current floor has a pointer that points to the 3D texture model for the prior matching floor and its walkable network, step 486.

When the final hash Hf for the current floor has no matches, step 480, then the floor plan is unique. A new walkable network for the current floor is generated, step 482, and its 3D texture model for floor 106 is stored and incorporated into 3D building model 442 and indoor navigation network 108.

This process of steps 472-480, and 482 or 486, is repeated for other floors in the building, step 484, until all floors are processed. Floor-specific parameters such as the floor name, and heights if different, can be stored either with a link to a prior floor, or with the 3D texture model and walkable network for the floor.

ALTERNATE EMBODIMENTS

Several other embodiments are contemplated by the inventors. For example many combinations and variations of the hardware and software are possible, such as for mobile device 40 and server 36 in FIG. 2. Various tasks may be performed by the CPU of mobile device 40 or by the CPU of server 36. Mobile device 40 could send data to server 36 for processing by server 36 when mobile device 40 is busy or has limited processing power, but could execute these tasks when local processing power is available on mobile device 40.

FIGS. 13D, 13E could be displayed simultaneously to the user, or could be displayed successively. The user could switch between the 2 displays, such as by using a hot key combination. Similarly FIGS. 10D, 10E could be displayed simultaneously or successively.

Geocoordinates 112 could be substituted with georeferencing points that allow the user to geo-reference specific points in floor plan to a base map. In this alternative for FIG. 4, once the user completes the georeferencing process, the server will have georeferencing parameters (e.g., mapping x, y coordinates from the 2D floor plan to longitude and latitude on the basemap). As a result, the layout can be vectorized into the global coordinate system.

Elevators and stairs can be created using a combination of polygons and lines. For elevators, a polygon may be created on each floor to represent the elevator, while lines are used to represent the doors as exits for network generation. For stairs, a polygon and lines are created for each floor, along with metadata such as the type of stairs (straight stairs, scissors stairs, half turn stairs, etc.). A 3D generation algorithm can utilize this metadata to generate a 3D model of the stairs, including the walls. Once the 3D model is generated, users can apply photo textures to stairs using the procedures described earlier.

The user could obtain 2D floor plan 102 as a file, or could provide a link to a file location of 2D floor plan 102, allowing the server to download 2D floor plan 102 from a third-party website on the Internet, rather than directly from mobile device 40. Thus the user can provide 2D floor plan 102 to server 36 either as a file or as a link or pointer to the file. The user could identify 2D floor plan 102, or 2D floor plan 102 could already have been identified and uploaded by a different user or by a user of the server.

The user may be a team of users, such as several users, each with a mobile device 40, capturing photos and mapping points on different floors, and other users in an office using a desktop, laptop, terminal, or other computer that executes a client application or program to access the server and its data. The office user could upload 2D floor plan 102 for all floors to the server, while the mobile users could use the previously uploaded 2D floor plan 102 and capture photos and refine 3D texture model for floor 106. Heights could be entered by the office user and corrected by the mobile users. An initial team of users could take initial photos and verify locations of exits, while a follow-up team could later verify and correct earlier entered information and photos.

The floor height may be different for some floors than for other floors. For example, the ground floor may have a larger floor height that upper floors. Parameters such as heights could be stored in various formats and units, and could be relative rather than absolute.

While tables have been shown, such as in FIG. 6, the user could enter the heights using a form rather than a table, or could use other means to enter heights, such as by being queried by the server for each height. The server could store heights and other data shown in tables in various formats in memory, such as in a database, rather than in a tabular format. Other tables are likewise shown for easier understanding, but are not necessarily used in electronic format by the server or its data storage systems. FIGS. 6 and 17 could be separate tables, or could be combined into a single table.

Rather than tagging each photo with the GPS coordinates and orientation, GPS and/or orientation data may be separately uploaded to the server and loaded into the table of FIG. 9. Rather than immediately processing each photo taken, several photos may be taken and then the process of FIG. 8 or FIG. 12 repeated for each previously-taken photo. The user could capture many photos while walking the building, and then later return home and then process each photo by assigning mapping points and selecting facing lines.

The camera orientation may not be the same as the orientation reported by mobile device 40, but may be derived from the reported orientation. For example, the camera may be rear-facing while the orientation reported may be front-facing. The orientation may be adjusted by the server to account for the camera angle within mobile device 40.

The orientation of the phone or camera can be tracked by using a gyroscope on the phone. The gyroscope measures the device's angular velocity or rate of rotation around the three axes. It provides information about the device's orientation and rotational speed. By continuously tracking rotational changes, the gyroscope can determine how the device is being tilted or turned by the user. The compass sensor on a phone, also known as a magnetometer, can be used to detect the facing direction of the device relative to the Earth's magnetic field. A sensor fusion algorithm, such as a complementary filter or a Kalman filter, can be used on a combined output of the gyroscope and compass sensor. These algorithms take advantage of the strengths of each sensor to provide a more accurate estimation of the user's facing orientation.

Selecting, highlighting, and moving points may be performed by several different mechanisms. Selection may be performed by a user touching facing wall 154 on a touch-screen, or by selecting from a list or menu of possible walls, or by confirming or rejecting a program's initial selection of facing wall 154, as an example.

Facing wall 154 can be highlighted by drawing or displaying it in a different color, a higher or lower brightness, a pattern such as dotted, dashed, etc., a larger thickness than other walls, blinking, or even with an arrow or other icon pointing to facing wall 154. Facing wall 154 can be highlighted to the user in a 3D viewer by setting a property of the wall to True. Alternatively, a light source can be created within the 3D viewer to shine light on the wall and highlight it to the user.

Points such as model points 171-172, 161-164, 271-274, may be displayed individually or may be corners of a box or other polygon, such as shown in FIG. 15, and may be moved on a touchscreen by dragging with a finger, or using a cursor. The locations of these points could be estimated by the program and initially displayed to allow the user to move them, or could be not displayed, but rather let the user touch the screen for each point before the points are displayed. While polygons with 4 points have been shown, triangles with 3 points, or polygons with more than 4 points could be used, especially for oddly-shaped walls or other features.

While using floor-plan portion 150 of 2D floor plan 102 has been shown in FIGS. 8-11, and using virtual 3D display 250 has been shown in FIGS. 12-14, either or both methods could be supported and used. Other variations are possible, such as switching between these 2 methods, or a hybrid method using portions of both methods.

Floor connection nodes, such as stairs, escalators, ramps, and elevators, may use a generic or default model of their interiors, or the user could take photos inside the stairs, escalators, ramps, and elevators that are applied as textures or are analyzed by the server program to provide more detailed information, such as the placement and number of landings on a flight of stairs, or the interior appearance of an elevator, such as the locations of buttons for other floors. More details may be inputted by the user, such as which floors each individual elevator goes to, since some tall buildings have multiple elevator banks that go to different groups of floors.

The walkable attribute may further have time parameters that indicate what time of day and what days the room is open to the public and what days and times the room is closed and thus not walkable.

While SHA256 has been described for generating cryptographic hashes, other hash functions could be used. Modifications to various procedures, processes, and flows could be made, and some steps may be re-ordered, performed in parallel or serial, or sub-divided in various ways. While feeding the textual representation of the walkable areas and lines, such as coding stored in a table or database, is described, some servers may use purely numeric identifiers rather than textual, and these numbers can be considered as text and entered into the hash engine. Rather than generate a new updated hash for each walkable geometry in step 474, two or more geometries may be concatenated and input together into the hash engine to reduce the number of hash updates needed.

Various additional processing could be performed, either by the server or by mobile device 40, such as using analysis tools to identify or suggest lines in 2D floor plan 102 that represent features such as exits, doors, stairs, elevators, etc. Artificial Intelligence (AI) or other Neural Networks or machine learning could be used for analysis. Suggestions generated by AI could be displayed to the user for confirmation or rejection, and the user responses used to improve the AI learning model.

The server may have several physical computing machines and storage devices, and these may be located at different physical locations. The user may have more than one mobile device 40, and more than one user may update the server with photos or other data for a particular building. Computer programmers and 3D modeling software experts are not needed since taking photos and moving the mapping points is simple and intuitive. The server software constructs 3D texture model for floor 106 and indoor navigation network 108 based on simple user inputs and photos that do not require knowledge of 3D modeling techniques. Thus 3D building models can be generated without human expert modeling.

Terms such as up, down, above, under, horizontal, vertical, inside, outside, are relative and depend on the viewpoint and are not meant to limit the invention to a particular perspective. Items may be rotated so that vertical is horizontal and horizontal is vertical, so these terms are viewer dependent.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A computer-implemented method to generate a 3D building model comprising:

uploading a 2D floor plan for a floor of a building and storing the 2D floor plan on a server having a processor and a memory;

executing a server program on the processor on the server, the server program generating a 3D model for the floor by extending upward polygons and lines generated by the server program vectorizing the 2D floor plan, wherein the polygons and lines are extended upward by a floor-to-ceiling height entered by a user;

the server program storing walkable flags that are set by the user for rooms and exits in the 3D model for the floor, a walkable flag indicating that the room or exit is walkable in a navigation network;

the server program linking together rooms and exits in the 3D model for the floor that have the walkable flag set to form a navigation network for the floor;

the server program generating a plurality of the 3D model for the floor for a plurality of floors in the building, the server program also generating a plurality of the navigation network for the plurality of floors;

the server program stacking the plurality of the 3D model for the floor and the plurality of the navigation network to form a 3D building model, wherein floors are separated by a floor-to-floor height input by the user;

the server program receiving floor connection nodes that are specified by the user for stairs, elevators, or escalators that connect together different floors in the plurality of floors;

wherein each floor connection node specifies a first floor and a second floor that are connected by an elevator, escalator, or stairs;

the server program connecting the navigation network for the first floor in the plurality of floors to the navigation network for the second floor in the plurality of floors for each floor connection node; and the server program outputting the plurality of navigation networks for the plurality of floors with the floor connection nodes connecting different floors as an indoor navigation network, the indoor navigation network for defining walkable routes through the building.

2. The computer-implemented method of claim 1 further comprising:

executing a mobile device program on a processor in a mobile device by a user;

the mobile device program capturing a photo taken by the user inside the building, the mobile device program associating the photo with a Global Positioning System (GPS) location and an orientation of a camera in the mobile device;

the server program sending a portion of the 3D model for the floor to the mobile device, the portion including the GPS location of the photo, the mobile device displaying the portion to the user, the user selecting a facing wall in the portion displayed, the mobile device program displaying model points on the facing wall on the portion displayed;

the mobile device program displaying mapping points overlaid upon the photo, the user setting locations of the model points displayed on the facing wall to correspond to the mapping points;

the server program receiving the photo and the mapping points from the mobile device program, the server placing the photo onto an image plane of the facing wall in the 3D model for the floor, wherein the mapping points of the photo are aligned to the model points of the facing wall.

3. The computer-implemented method of claim 2 wherein the server program converts rooms in the 2D floor plan into polygons, and doors in the 2D floor plan into lines.

4. The computer-implemented method of claim 3 wherein the mapping points are corners of the facing wall;

wherein the model points are corners of the facing wall in the 3D model for the floor.

5. The computer-implemented method of claim 3 wherein the mapping points comprise 4 points for the facing wall;

wherein the model points comprise 4 points for the facing wall in the 3D model for the floor.

6. The computer-implemented method of claim 2 wherein the mobile device program further comprises a 3D viewer application that adjusts a view shown to the user on a display of the mobile device as an orientation of the camera is changed so that the camera views a portion of the building that corresponds to a portion of a virtual world modeled by the 3D model for the floor.

7. The computer-implemented method of claim 6 wherein the mobile device displays both the photo captured by the mobile device and the portion of the virtual world modeled by the 3D model for the floor.

8. The computer-implemented method of claim 3 wherein the portion of the 3D model for the floor sent by the server program to the mobile device is a 2D floor portion having polygons and lines in a floor plane;

the mobile device program displaying the 2D floor portion to the user and displaying the facing wall as a line in the 2D floor portion;

wherein a 2D floor plan is displayed to the user on the mobile device when taking photos.

9. The computer-implemented method of claim 8 wherein the model points comprise 2 points for a line representing the facing wall in the 2D floor portion for the floor after vectorization.

10. The computer-implemented method of claim 2 further comprising:

the server program sending a basemap to the mobile device that is overlaid with the 2D floor plan and displayed to the user, the user moving the 2D floor plan relative to the basemap to align the 2D floor plan to the basemap, the mobile device program sending geocoordinates of the 2D floor plan overlaying the basemap to the server program, the server program placing a 3D building model generated from the 2D floor plan at a location of the geocoordinates in the basemap.

11. The computer-implemented method of claim 10 further comprising executing a deduplication program, activated by the server program, the deduplication program when executed by a processor on the server:

generating an initial hash value using a hash function and a seed value;

wherein features are polygons representing rooms and lines representing exits the 3D model for the floor;

sorting features having the walkable flag set according to geographical locations of the features within a current floor in the plurality of floors;

updating the initial hash value with sorted features for the current floor using the hash function to generate a current floor hash for the current floor;

comparing the current floor hash for the current floor to floor hashes for other floors in the plurality of floors;

wherein when the current floor hash matches a floor hash for a matching floor in the plurality of floors, pointing to the navigation network for the matching floor and pointing to the 3D model for the matching floor and not storing the navigation network for the current floor and not storing the 3D model for current floor;

whereby the 3D model for matching floor and the navigation networks for the matching floor are reused for the current floor.

12. The computer-implemented method of claim 11 wherein the hash function is a cryptographic hash function.

13. A 3D building model generator system comprising:

a mobile device program, executing on a processor in a mobile device;

an input receiving a 2D floor plan for a floor of a building;

a server program, executing on a processor on a server computer, that receives the 2D floor plan and receives a floor-to-ceiling height inputted by a user, the server program generating a 3D model for the floor by extending upward polygons and lines generated by the server program vectorizing the 2D floor plan, wherein the polygons and lines are extended upward by the floor-to-ceiling height;

the mobile device program capturing a photo taken by a user inside the building, the photo having a Global Positioning System (GPS) location and an orientation of a camera in the mobile device;

the server program sending a portion of the 3D model for the floor to the mobile device, the portion including the GPS location of the photo, the mobile device displaying the portion to the user, the user selecting a facing wall in the portion displayed, the mobile device program displaying model points on the facing wall;

the mobile device program displaying mapping points overlaid upon the photo, the user setting locations of the mapping points to correspond to the model points displayed on the facing wall, or the user setting locations of the model points displayed on the facing wall to correspond to the mapping points;

the server program receiving the photo and the mapping points from the mobile device program, the server computer placing the photo onto an image plane of the facing wall in the 3D model for the floor, wherein the mapping points of the photo are aligned to the model points of the facing wall;

walkable flags set by the user for rooms and exits in the 3D model for the floor, a walkable flag indicating that the room or exit is walkable in a navigation network;

wherein the server program links together rooms and exits in the 3D model for the floor that have the walkable flag set to form a navigation network for the floor;

wherein the mobile device program and the server program generate a plurality of the 3D model for the floor for a plurality of floors in the building, the server program also generating a plurality of the navigation network for the plurality of floors;

the server program stacking the plurality of the 3D model for the floor and the plurality of the navigation network to form a 3D building model, wherein floors are separated by a floor-to-floor height input by the user;

the server program receiving floor connection nodes that are specified by the user for stairs, elevators, or escalators that connect together different floors in the plurality of floors;

wherein each floor connection node specifies a first floor and a second floor that are connected by an elevator, escalator, or stairs;

the server program connecting the navigation network for the first floor in the plurality of floors to the navigation network for the second floor in the plurality of floors for each floor connection node;

the server program outputting the plurality of navigation networks for the plurality of floors with the floor connection nodes connecting different floors as an indoor navigation network.

14. The 3D building model generator system of claim 13 wherein the mapping points comprise 4 points for corners of the facing wall;

wherein the model points comprise 4 points for the facing wall in the 3D model for the floor.

15. The 3D building model generator system of claim 14 wherein the mobile device program further comprises a 3D viewer application that adjusts a view shown to the user on a display of the mobile device as an orientation of the camera is changed so that the camera views a portion of the building that corresponds to a portion of a virtual world modeled by the 3D model for the floor.

16. The 3D building model generator system of claim 13 wherein the portion of the 3D model for the floor sent by the server program to the mobile device is a 2D floor portion having polygons and lines in a floor plane;

the mobile device program displaying the 2D floor portion to the user and displaying the facing wall as a line in the 2D floor portion;

wherein a 2D floor plan is displayed to the user on the mobile device when taking photos.

17. The 3D building model generator system of claim 13 further comprising:

a basemap, sent from the server program to the mobile device that is overlaid with the 2D floor plan and displayed to the user, the user moving the 2D floor plan relative to the basemap to align the 2D floor plan to the basemap, the mobile device program sending geocoordinates of the 2D floor plan overlaying the basemap to the server program, the server program placing a 3D building model generated from the 2D floor plan at a location of the geocoordinates in the basemap.

18. The 3D building model generator system of claim 13 further comprising:

a deduplication program, activated by the server program, the deduplication program when executed by a processor on the server computer:

generating an initial hash value using a hash function and a seed value;

wherein features are polygons representing rooms and lines representing exits the 3D model for the floor;

sorting features having the walkable flag set according to geographical locations of the features within a current floor in the plurality of floors;

updating the initial hash value with sorted features for the current floor using the hash function to generate a current floor hash for the current floor;

comparing the current floor hash for the current floor to floor hashes for other floors in the plurality of floors;

wherein when the current floor hash matches a floor hash for a matching floor in the plurality of floors, pointing to the navigation network for the matching floor and pointing to the 3D model for the matching floor and not storing the navigation network for the current floor and not storing the 3D model for current floor;

wherein the hash function is a cryptographic hash function;

whereby the 3D model for matching floor and the navigation networks for the matching floor are reused for the current floor.

19. A non-transitory computer-readable medium storing computer-readable instructions, which when executed on a computer, cause the computer to generate an indoor navigation network by a method comprising:

uploading a 2D floor plan for a floor of a building and storing the 2D floor plan on a server;

converting rooms in the 2D floor plan into polygons, and doors in the 2D floor plan into lines;

generating a 3D model for the floor by extending upward polygons and lines, wherein the polygons and lines are extended upward by a floor-to-ceiling height entered by a user;

storing walkable flags that are set by the user for rooms and exits in the 3D model for the floor, each walkable flag indicating that the room or exit is walkable in a navigation network;

linking together rooms and exits in the 3D model for the floor that have a walkable flag set to form a navigation network for the floor;

generating a plurality of the 3D model for the floor for a plurality of floors in the building from photos captured by a user operating a mobile device;

generating a plurality of the navigation network for the plurality of floors;

stacking the plurality of the 3D model for the floor and the plurality of the navigation network to form a 3D building model, wherein floors are separated by a floor-to-floor height input by the user;

receiving floor connection nodes, specified by the user, for stairs, elevators, or escalators that connect together different floors in the plurality of floors;
wherein each floor connection node specifies a first floor and a second floor that are connected by an elevator, escalator, or stairs;
connecting the navigation network for the first floor in the plurality of floors to the navigation network for the second floor in the plurality of floors for each floor connection node; and
outputting the plurality of navigation networks for the plurality of floors with the floor connection nodes connecting different floors as an indoor navigation network, the indoor navigation network for defining walkable routes through the building.

20. The non-transitory computer-readable medium of claim 19 wherein the method further comprises:
executing a mobile device program on a processor in a mobile device by a user;
the mobile device program capturing a photo taken by the user inside the building, the mobile device program associating the photo with a Global Positioning System (GPS) location and an orientation of a camera;
sending a portion of the 3D model for the floor to the mobile device, the portion including the GPS location of the photo, the mobile device displaying the portion to the user, the user selecting a facing wall in the portion displayed, the mobile device program displaying model points on the facing wall on the portion displayed;
the mobile device program displaying mapping points overlaid upon the photo, the user setting locations of the mapping points to correspond to the model points displayed on the facing wall, or the user setting locations of the model points displayed on the facing wall to correspond to the mapping points;
receiving the photo and the mapping points from the mobile device program, the server placing the photo onto an image plane of the facing wall in the 3D model for the floor, wherein the mapping points of the photo are aligned to the model points of the facing wall.

* * * * *